(12) United States Patent
Wermuth et al.

(10) Patent No.: US 8,186,329 B2
(45) Date of Patent: May 29, 2012

(54) METHOD FOR CONTROLLING A SPARK-IGNITION DIRECT-INJECTION INTERNAL COMBUSTION ENGINE AT LOW LOADS

(75) Inventors: Nicole Wermuth, Ann Arbor, MI (US); Paul M. Najt, Bloomfield Hills, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 771 days.

(21) Appl. No.: 12/369,086

(22) Filed: Feb. 11, 2009

(65) Prior Publication Data

US 2009/0205612 A1    Aug. 20, 2009

Related U.S. Application Data

(60) Provisional application No. 61/029,038, filed on Feb. 15, 2008.

(51) Int. Cl.
*F02B 5/02* (2006.01)
*F02D 41/02* (2006.01)
*F02D 13/02* (2006.01)

(52) U.S. Cl. ............... 123/406.19; 123/299; 123/305; 701/103

(58) Field of Classification Search ............. 123/406.19, 123/299, 300, 304, 305, 575, 577, 90.15; 701/103–105, 110
See application file for complete search history.

(56) References Cited

U.S. PATENT DOCUMENTS

| | | | |
|---|---|---|---|
| 6,971,365 B1 | 12/2005 | Najt | |
| 6,994,072 B2 | 2/2006 | Kuo | |
| 7,059,281 B2 | 6/2006 | Kuo | |
| 7,128,047 B2 | 10/2006 | Kuo | |
| 7,346,446 B2 | 3/2008 | Kang | |
| 7,684,925 B2 * | 3/2010 | Kuo et al. | 701/113 |
| 8,078,387 B2 * | 12/2011 | Kumano et al. | 123/299 |
| 8,099,230 B2 * | 1/2012 | Wermuth et al. | 701/111 |
| 2007/0261672 A1 | 11/2007 | Lippert | |
| 2008/0243356 A1 | 10/2008 | Kang | |
| 2008/0283006 A1 | 11/2008 | Sutherland | |

FOREIGN PATENT DOCUMENTS

| | | |
|---|---|---|
| EP | 1435442 B1 | 7/2004 |
| EP | 1674702 A1 | 6/2006 |
| EP | 1681452 A1 | 7/2006 |
| JP | 2001152919 A | 6/2001 |
| JP | 2001355449 A | 12/2001 |
| JP | 2009180197 A * | 8/2009 |

OTHER PUBLICATIONS

U.S. Appl. No. 12/338,028, filed Dec. 18, 2008, Nicole Wermuth.

* cited by examiner

*Primary Examiner* — Hieu T Vo (57) ABSTRACT

A spark-ignition direct-injection internal combustion engine is controlled at low loads through split fuel injections and spark discharges including one injection and spark during a negative valve overlap period and another injection and spark during a compression phase of the engine cycle.

19 Claims, 6 Drawing Sheets

METHOD FOR CONTROLLING A SPARK-IGNITION DIRECT-INJECTION INTERNAL COMBUSTION ENGINE AT LOW LOADS

CROSS REFERENCE TO RELATED APPLICATIONS

This application claims the benefit of U.S. Provisional Application No. 60/029,038 filed on Feb. 15, 2008 which is hereby incorporated herein by reference.

TECHNICAL FIELD

This disclosure relates to the operation and control of homogeneous-charge compression-ignition (HCCI) engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition combustion mode, also referred to as controlled auto-ignition combustion, under predetermined speed/load operating conditions. The controlled auto-ignition combustion comprises a distributed, flameless, auto-ignition combustion process that is controlled by oxidation chemistry. An engine operating in the controlled auto-ignition combustion mode has a cylinder charge that is preferably homogeneous in composition, temperature, and residual exhaust gases at intake valve closing time. Controlled auto-ignition combustion is a distributed kinetically-controlled combustion process with the engine operating at a dilute air/fuel mixture, i.e., lean of an air/fuel stoichiometric point, with relatively low peak combustion temperatures, resulting in low NOx emissions. The homogeneous air/fuel mixture minimizes occurrences of rich zones that form smoke and particulate emissions.

Controlled auto-ignition combustion depends strongly on factors such as cylinder charge composition, temperature, and pressure at intake valve closing. Hence, the control inputs to the engine must be carefully coordinated to ensure auto-ignition combustion. Controlled auto-ignition combustion strategies may include using an exhaust recompression valve strategy. The exhaust recompression valve strategy includes controlling a cylinder charge temperature by trapping hot residual gas from a previous engine cycle by adjusting valve close timing. In the exhaust recompression strategy, the exhaust valve closes before top-dead-center (TDC) and the intake valve opens after TDC creating a negative valve overlap (NVO) period in which both the exhaust and intake valves are closed, thereby trapping the exhaust gas. The opening timings of the intake and exhaust valves are preferably symmetrical relative to TDC intake. Both a cylinder charge composition and temperature are strongly affected by the exhaust valve closing timing. In particular, more hot residual gas from a previous cycle can be retained with earlier closing of the exhaust valve leaving less room for incoming fresh air mass, thereby increasing cylinder charge temperature and decreasing cylinder oxygen concentration. In the exhaust recompression strategy, the exhaust valve closing timing and the intake valve opening timing are measured by the NVO period.

In addition to a valve control strategy, there must be a suitable fuel injection strategy for combustion. At low fueling rates (e.g., <7 mg/cycle at 1000 rpm in an exemplary 0.55 L combustion chamber volume) the cylinder charge may not be hot enough for controlled auto-ignited combustion even with maximum allowable NVO, leading to partial-burn or misfire.

It is known to increase the cylinder charge temperature by pre-injecting a small amount of fuel when a piston approaches TDC intake during the recompression portion of NVO. A portion of the pre-injected fuel reforms due to high pressure and temperature during the recompression portion, and releases heat energy, increasing the cylinder charge temperature enough for complete controlled auto-ignition combustion of the combustion charge resulting from the subsequent main fuel injection. The amount of such fuel reforming is based upon the pre-injection mass and timing, typically with fuel reforming increasing with earlier pre-injection timing and greater pre-injection fuel mass.

However, excessive fuel reforming to increase operability range of controlled auto-ignition can increase combustion instability and thereby decreases fuel efficiency. Therefore, it would be advantageous to extend operating ranges for controlled auto-ignition combustion without incurring combustion instability, and therefore increasing fuel efficiency.

SUMMARY

A method for controlling a spark ignition direct injection engine configured to control intake and exhaust valves at low loads includes monitoring engine operating conditions and operator inputs and controlling the intake and exhaust valves to achieve a negative valve overlap period. Desired fuel mass injections for first, second and third fuel injection events of an engine cycle are determined and the first fuel injection event is executed and a first spark discharged during a recompression phase of the negative valve overlap period. The second fuel injection event is selectively executed during an intake phase of the engine cycle. The third fuel injection event is executed and a second spark discharged during a compression phase of the engine cycle.

BRIEF DESCRIPTION OF THE DRAWINGS

One or more embodiments will now be described, by way of example, with reference to the accompanying drawings, in which.

DETAILED DESCRIPTION

Figure 1:
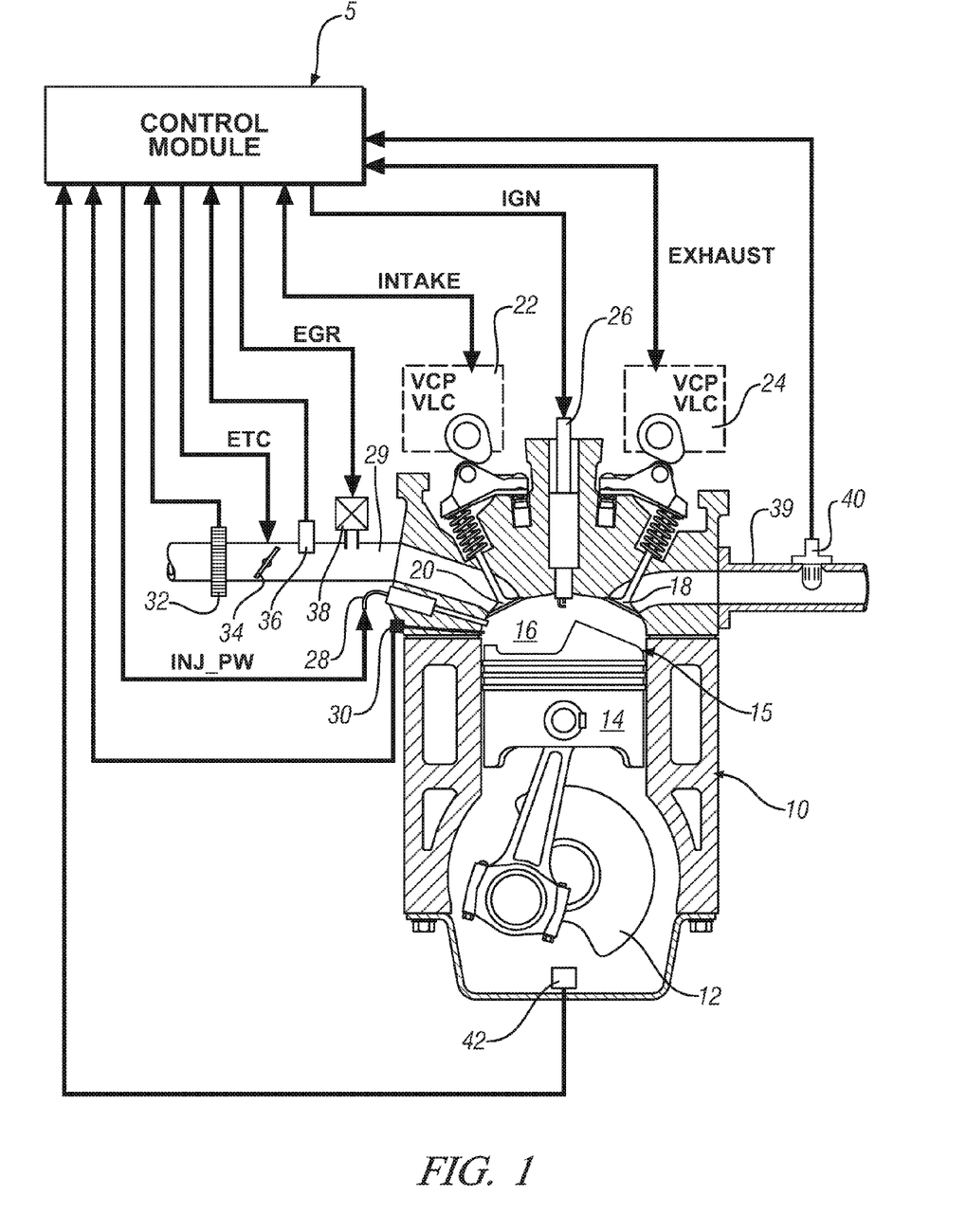
FIG. 1 is a schematic drawing of an exemplary engine system, in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and an accompanying control module 5 that have been constructed in accordance with an embodiment of the disclosure. The engine 10 may be selectively operative in a plurality of combustion modes, including a controlled auto-ignition combustion mode, a homogeneous spark-ignition combustion mode, and a stratified-charge spark-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles.

In one embodiment the engine 10 can be coupled to a transmission device (not shown) to transmit tractive power to a driveline of a vehicle (not shown). A transmission can include a hybrid transmission including torque machines operative to transfer tractive power to a driveline.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device that is used to control air flow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38. The combustion chambers 16 are fluidly connected to an exhaust manifold 39 via the exhaust valves 18.

Air flow from the intake manifold 29 into each of the combustion chambers 16 is controlled by one or more intake valves 20. Flow of combusted gases from the combustion chambers 16 to the exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. In one embodiment, the engine 10 is equipped with devices for controlling valve lift of the intake valves and the exhaust valves, referred to as variable lift control (VLC) devices. The VLC devices are operative to control valve lift, or opening, to one of two distinct steps in one embodiment. The two distinct steps include a low-lift valve opening (about 4-6 mm) for low speed, low load engine operation, and a high-lift valve opening (about 8-10 mm) for high speed, high load engine operation. The engine 10 is further equipped with devices for controlling phasing (i.e., relative timing) of opening and closing of the intake and exhaust valves 20 and 18, referred to as variable cam phasing (VCP), to control phasing beyond that which is effected by the two-step VLC lift. In one embodiment, there is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5 through camshaft rotation position sensors for the intake camshaft (not shown) and the exhaust camshaft (not shown). The intake and exhaust VCP/VLC systems 22 and 24 have limited ranges of authority over which opening and closing of the intake and exhaust valves 20 and 18 can be adjusted and controlled. VCP systems can have a range of phasing authority of about 60°-90° of camshaft rotation, thus permitting the control module 5 to advance or retard opening and closing of one or both of the intake and exhaust valves 20 and 18. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. The control module 5 may adjust the intake and exhaust VCP/VLC systems 22 and 24 to achieve NVO.

The engine 10 includes a fuel injection system, comprising a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system (not shown).

The engine 10 includes a spark-ignition system (not shown) by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output (RPM) and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 is preferably a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory and executed to provide the respective functions of each computer. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., a throttle pedal position and a brake pedal position) to determine an operator torque request and from the sensors indicating the engine speed and intake air temperature, and coolant temperature and other ambient conditions.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust re-breathing strategy) in one embodiment. The control module 5 can operate to turn the engine on and off during ongoing vehicle operation, and can operate to selectively deactivate a portion of the combustion chambers or a portion of the valves through control of fuel and spark and valve deactivation. The control module 5 can control air/fuel ratio based upon feedback from sensors 40.

Figure 2:
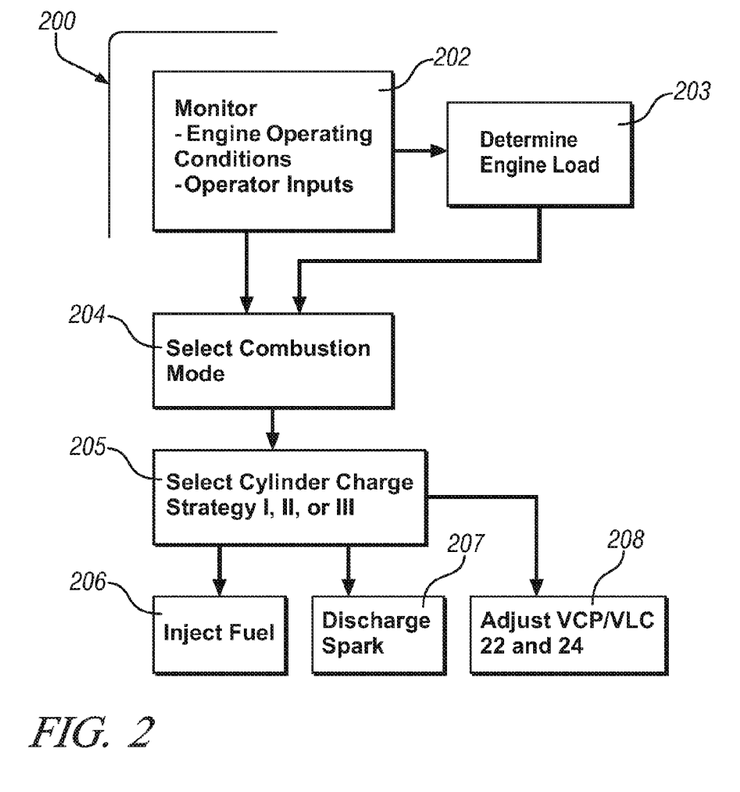
FIG. 2 is a control flow chart of a cylinder charge control scheme, in accordance with the present disclosure.

FIG. 2 is a control flow chart of a fuel injection control scheme 200 for operating the engine 10 described with reference to FIG. 1. The control scheme 200 is preferably executed as one or more algorithms in the control module 5. The control scheme 200 comprises monitoring engine operating conditions including engine speed, intake air temperature, intake air mass, and cylinder pressure, and operator inputs including the operator torque request (202). The engine load is determined based upon the operator torque request, the intake air mass, and parasitic loads, e.g., HVAC, battery charges, and electric loads (203). Engine speed is monitored by the crank sensor 42. Intake air temperature and intake air mass are monitored by the mass airflow sensor 32. Cylinder pressure is monitored by the combustion sensor 30.

One of a plurality of combustion modes is selected for fueling and controlling the engine 10 based upon states of engine parameters including engine speed and load (204). One of a first, second, and third cylinder charge strategy is selected corresponding to the selected combustion mode (205). The control module 5 controls fuel injection (206), spark discharge (207), and the intake and exhaust VCP/VLC systems 22 and 24 (208) corresponding to the selected cylinder charge strategy.

Figure 3:
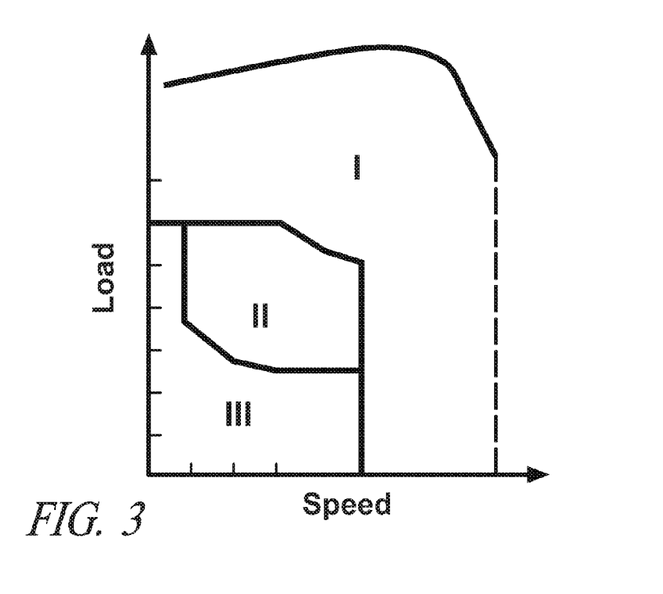
FIG. 3 graphically illustrates exemplary speed and load operating zones for cylinder charge strategies, in accordance with the present disclosure.

FIG. 3 graphically illustrates exemplary operating zones defined by speed and load operating ranges for a plurality of combustion modes and corresponding cylinder charge strategies with reference to FIG. 2. The engine parameters comprising engine speed (RPM) and load (LOAD) are derivable from engine operating parameters such as engine fuel flow, manifold pressure, or mass air flow. A preferred speed and load operating zone for each of the cylinder charge strategies is based upon engine operating parameters, including, e.g., combustion stability, fuel consumption, emissions, engine torque output, and is determined for a specific hardware application. Boundaries which define the preferred speed and load operating zones to delineate the cylinder charge strategies are predetermined and may be determined during pre-production engine calibration and development and are executed in the control module 5.

In operation, the first cylinder charge strategy is selected to fuel and control the engine 10 when the engine 10 is in a speed/load operating zone corresponding to zone I (I). The second cylinder charge strategy is selected to fuel and control the engine 10 when the engine 10 is in a speed/load operating zone corresponding to zone II (II). The third cylinder charge strategy is selected to fuel and control the engine 10 when the engine 10 is in a speed/load operating zone corresponding to zone III (III) in FIG. 3. The third cylinder charge strategy comprises an idle and low load cylinder charge strategy. Zone III encompasses engine idle and low engine loads. The idle and low load cylinder charge strategy may be selected when the intake air temperature is less than a threshold.

The engine 10 can transition between the first, second, and third cylinder charge strategies to achieve preferred targets related to fuel consumption, emissions, and engine stability, among other considerations and corresponding to engine speed and load. As one skilled in the art will recognize, many cylinder charge strategies and combustion modes may correspond to different preferred speed and load operating zones.

In one embodiment, the first cylinder charge strategy includes operating the engine 10 in a homogeneous spark-ignition combustion mode comprising a single fuel injection event corresponding to the intake phase of an engine cycle to achieve a mean best torque. Fuel mass discharge for the single fuel injection event corresponds to the operator torque request. The first cylinder charge strategy encompasses an operating zone whereby the engine 10 is primarily used for transmitting tractive torque to the driveline under high speed and high load operation.

In one embodiment, the second cylinder charge strategy includes operating the engine 10 lean in a single injection auto-ignition combustion mode. The control scheme 200 executes one fuel injection event preferably during the intake phase of an engine cycle. A fuel mass discharge for the fuel injection event is based upon the operator torque request.

Figure 4:
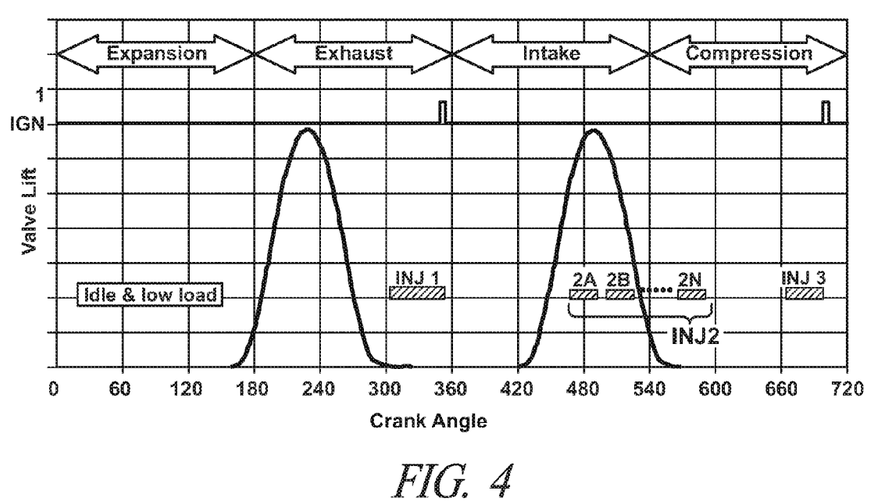
FIG. 4 graphically illustrates an idle and low load fuel cylinder charge strategy during an engine cycle, in accordance with the present disclosure.

FIG. 4 graphically illustrates execution of the idle and low load cylinder charge strategy over a four stroke engine cycle of the engine 10. FIG. 4 depicts valve lift (Valve Lift) with respect to crank angle (Crank Angle) for an engine cycle. The four stroke engine cycle includes sequentially repeating four phases: (1) expansion; (2) exhaust; (3) intake; and (4) compression. During NVO, a recompression phase begins when the exhaust valve 18 is closed and ends when the piston 14 is at TDC. After the piston 14 recedes from TDC, recompression is completed and the combustion chamber 16 expands. NVO subsequently ends when the intake valve 20 opens.

Figure 5:
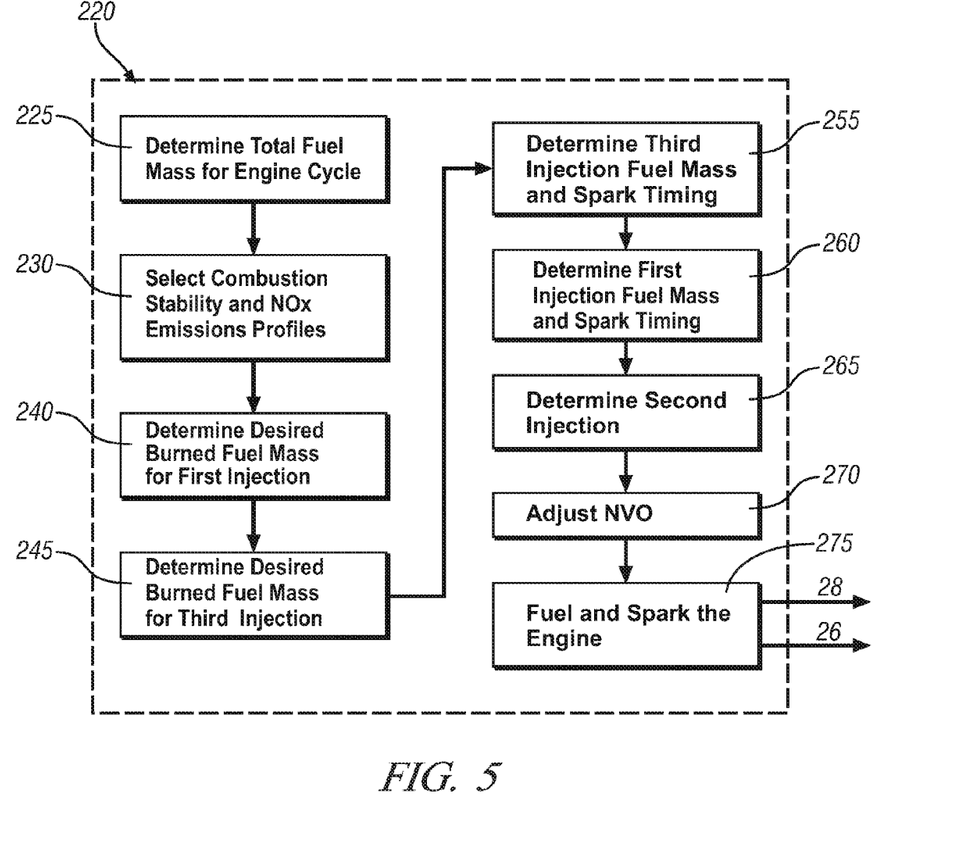
FIG. 5 is a control flow chart for the idle and low load fuel cylinder charge strategy, in accordance with the present disclosure.

FIG. 5 shows the idle and low load cylinder charge strategy (220) described with reference to FIG. 4. The idle and low load cylinder charge strategy comprises operating the engine lean and executing a plurality of fuel injection events each engine cycle. A first fuel injection event is executed during the recompression phase. A second fuel injection event is selectively executed substantially during the intake phase and may continue into the beginning of the compression phase, i.e., from the start of the compression phase to a midpoint of the compression phase. As described hereinbelow, the second fuel injection event may selectively occur. A third fuel injection event is executed substantially during the ending of the compression phase, i.e., from a midpoint of the compression phase to substantially piston TDC. Spark discharge events are executed following the first and third fuel injection events from the spark plug 26. As one skilled in the art will recognize, executing the first, second, and third fuel injection events each comprises injecting at least one fuel pulse by actuating the fuel injector 28. For example, FIG. 4 shows multiple fuel pulses (2A, 2B . . . 2N) for the second fuel injection event.

Desired burned fuel mass for each of the first and third fuel injection events is determined based upon engine out NOx emissions and combustion stability considerations. The fuel mass burned during the recompression phase can be correlated to combustion stability, e.g., COV of IMEP. The fuel mass burned during the recompression phase can be correlated to NOx emissions. As more fuel is reformed during recompression, the NOx emissions decrease; however, combustion stability decreases (COV of IMEP increases). Conversely, as more fuel is burned during the third fuel injection event, the compression phase, NOx emissions increase and combustion stability increases (COV of IMEP decreases).

In operation, the desired burned fuel mass for the first fuel injection event is determined based upon NOx emissions, thereby minimizing NOx emissions, and the desired burned fuel mass for the third fuel injection event is determined based upon combustion stability, thereby maximizing combustion stability. NOx emissions and combustion stability data may be experimentally determined for a specific hardware application and for varying engine operating conditions with respect to burned fuel mass for the first and third fuel injection events. NOx emissions and combustion stability profiles may be created based upon the experimentally determined data for ranges of engine operating conditions. The profiles may be indexed and stored in the control module 5. The NOx emissions and combustion stability profiles may then be selected and used corresponding to the monitored engine operating conditions. Engine operating conditions include, for example, thermal conditions in the cylinder, intake air temperature, and cylinder pressure.

A predetermined maximum NOx emissions threshold for the first fuel injection event, and a predetermined maximum combustion instability threshold for the third fuel injection event are stored in the control module 5. A maximum NOx threshold for the first fuel injection event and a maximum combustion instability threshold for the third fuel injection event permit a minimum fuel quantity to be injected in the first and third fuel injection events thereby minimizing NOx emissions and combustion instability.

Figure 6:
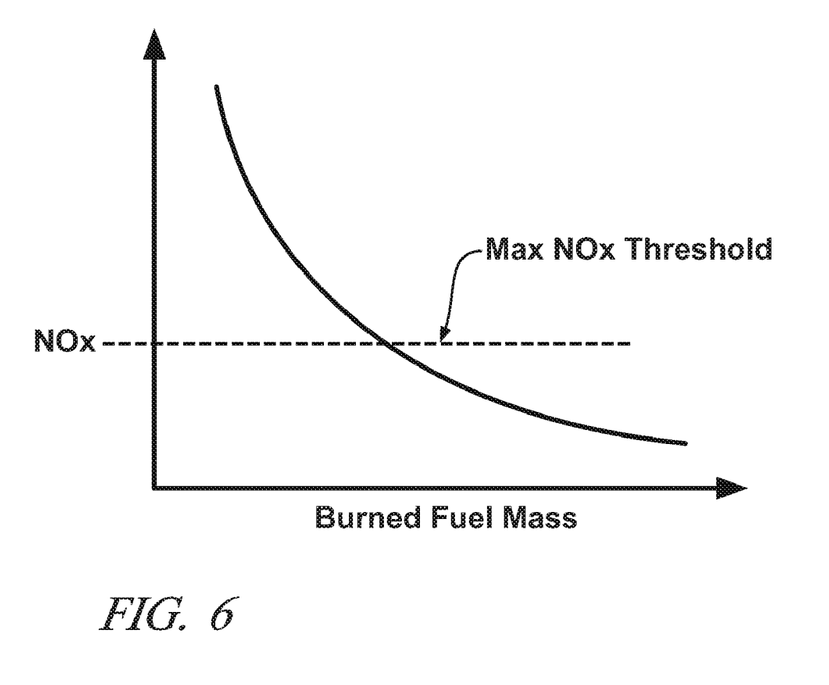
FIG. 6 graphically illustrates an exemplary NOx emissions profile for a first fuel injection event, in accordance with the present disclosure.

FIG. 6 graphically illustrates an exemplary NOx emissions profile for the first fuel injection event. NOx emissions profiles are experimentally determined for a specific hardware application and for varying engine operating conditions in one embodiment. The NOx emissions profiles are preferably stored in memory of the control module 5. A predetermined NOx emissions profile is selected based upon the engine operating conditions. The predetermined maximum NOx emissions threshold is used to determine the desired burned fuel mass for the first fuel injection event. The predetermined maximum NOx emissions threshold is used to determine a corresponding desired burned fuel mass. The corresponding desired burned fuel mass is the desired burned fuel mass for the first fuel injection event.

Figure 7:
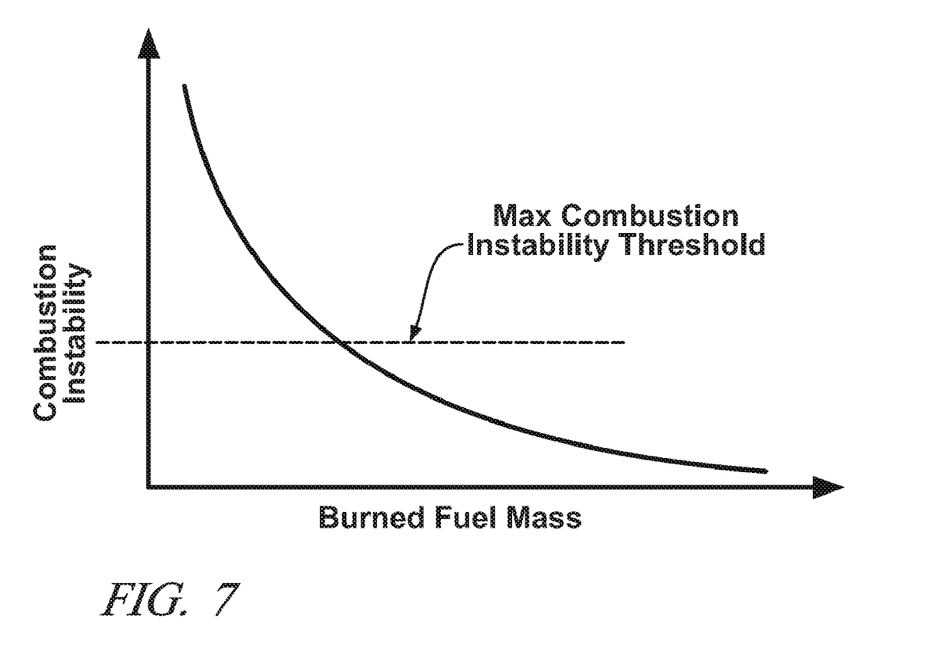
FIG. 7 graphically illustrates an exemplary combustion stability profile, in accordance with the present disclosure.

FIG. 7 graphically illustrates an exemplary combustion instability profile for the third fuel injection event. Combustion instability profiles are experimentally determined for a specific hardware application and for varying engine operating conditions. The profiles are stored in memory of the control module 5. A predetermined combustion instability profile is selected based upon engine operating conditions. The predetermined maximum combustion instability threshold is used to determine the desired burned fuel mass for the third fuel injection event. The predetermined maximum combustion instability threshold is located and a corresponding desired burned fuel mass for the third fuel injection event is determined. As one skilled in the art will recognize, combustion instability is the inverse of COV of IMEP.

Referring back to FIG. 5, a total fuel mass for each engine cycle is determined based upon engine operating conditions and the operator torque request (225). Combustion stability and NOx emissions profiles are selected based upon the engine operating conditions (230). The desired burned fuel mass for the first injection event (240) is determined based upon the predetermined maximum NOx emissions threshold as described hereinabove. The desired burned fuel mass for the third injection event (245) is determined based upon the predetermined maximum combustion instability threshold as described hereinabove.

After the desired burned fuel mass for the first and third fuel injection events are determined, desired fuel mass, and fuel injection and spark timing with respect to crank angle are determined for the third fuel injection event (255) and the first fuel injection event (260).

Figure 8:
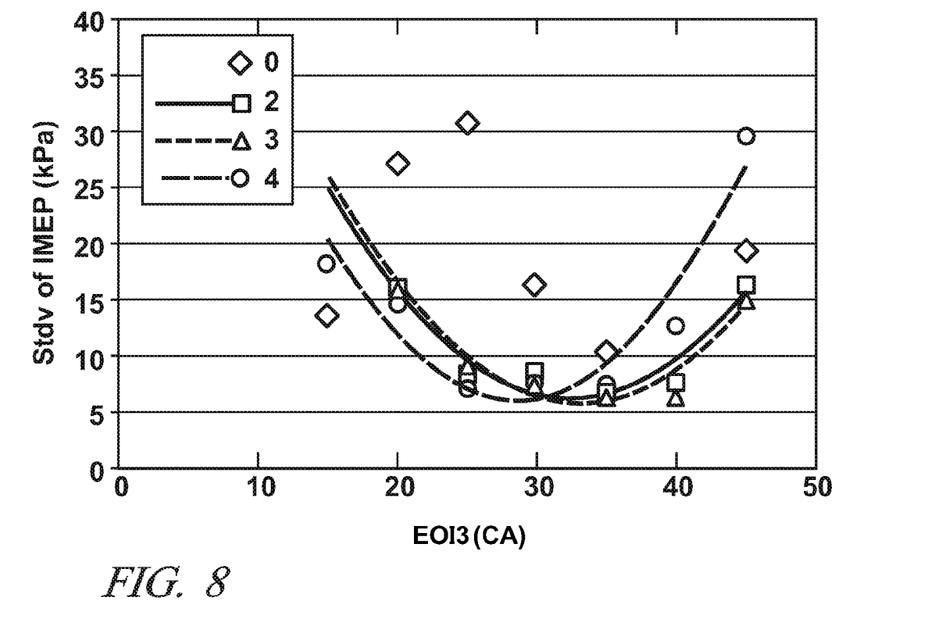
FIG. 8 graphically illustrates combustion instability with respect to fuel injection timing for a third fuel injection event, in accordance with the present disclosure.

FIG. 8 graphically illustrates results of engine operating showing combustion stability (Stdv of IMEP (kPa)) as a function of fuel injection timing for different spark discharge timings. FIG. 8 shows a fuel injection profile depicting fuel injection timing for the third fuel injection event as a function of crank angle degrees before TDC whereat a last fuel pulse ends for a predetermined injected fuel mass (EOI3(CA)). Spark discharge timings are indicated by elapsed crank angle after the last fuel pulse ends. Combustion stability with respect to fuel injection timing for the third fuel injection event may be experimentally determined for a specific hardware application for varying engine operating conditions, spark discharge timings, and injected fuel mass in one embodiment. Predetermined combustion stability profiles for fuel injection timings at ranges of engine operating conditions and spark discharge timings may be stored in memory of the control module 5.

In operation, the control module 5 determines fuel injection timing for the third fuel injection event based upon the desired burned fuel mass for the third injection event and combustion stability considerations (255). The control module 5 selects fuel injection profiles based upon the desired burned fuel mass, i.e., fuel injection profiles for injected fuel mass corresponding to a desired burned fuel mass. The control module 5 uses the remaining fuel injection profiles to determine the fuel injection and spark timing. The fuel injection timing and spark discharge timing for the third fuel injection event are determined based upon the profiles and combustion stability indicated by a maximum standard deviation of IMEP (Stdv of IMEP). Preferably, a fuel injection timing corresponding to a lowest standard deviation of IMEP below the maximum standard deviation of IMEP is selected.

Figure 9:
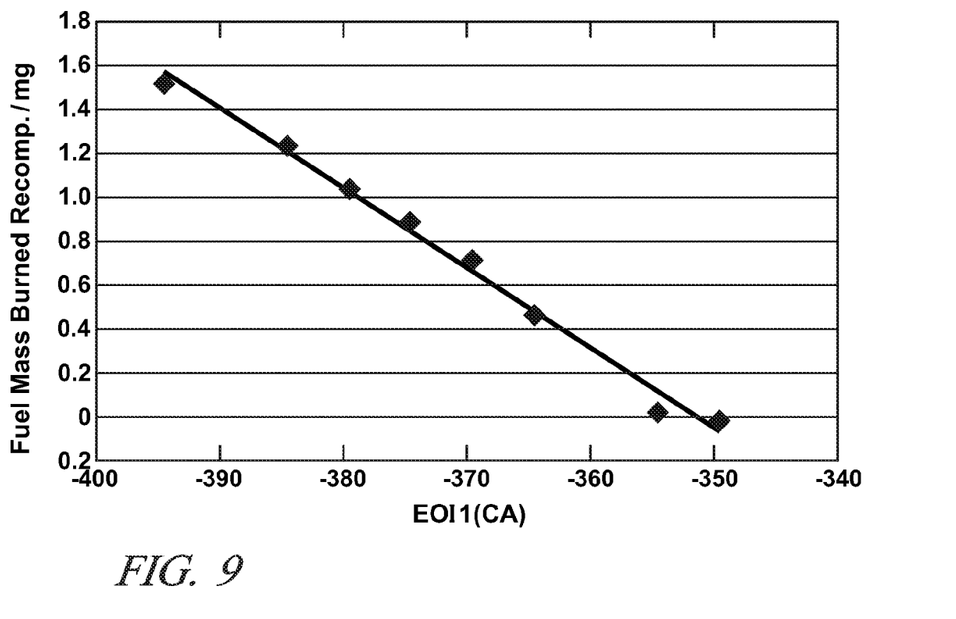
FIG. 9 graphically illustrates burned fuel mass as a function of fuel injection timing for a first fuel injection event, in accordance with the present disclosure.

After fuel injection and spark discharge timing for the third fuel injection event are determined (255), fuel injection timing for the first fuel injection event (260) is determined based upon a selected profile and the desired burned fuel mass for the first fuel injection event. FIG. 9 graphically illustrates results of engine operating showing fuel mass burned during recompression as a function of fuel injection timing. FIG. 9 depicts fuel injection timing for the first fuel injection event with respect to crank angle degrees whereat a last fuel pulse ends (EOI1(CA)). The relationship between the fuel mass burned during recompression and the timing of the end of the last fuel pulse is determined based upon experimental data and determined for a specific hardware application and for varying engine operating conditions. The relationship for ranges of engine operating conditions may be stored in memory of the control module 5 and then selected based upon monitored engine operating conditions. Spark discharge timing for the first fuel injection event is predetermined and is preferably executed immediately after the end of the last fuel pulse of the first fuel injection event. Fuel mass for the first fuel injection event is determined based upon a predetermined relationship between the desired burned fuel mass and injected fuel mass.

Figure 10:
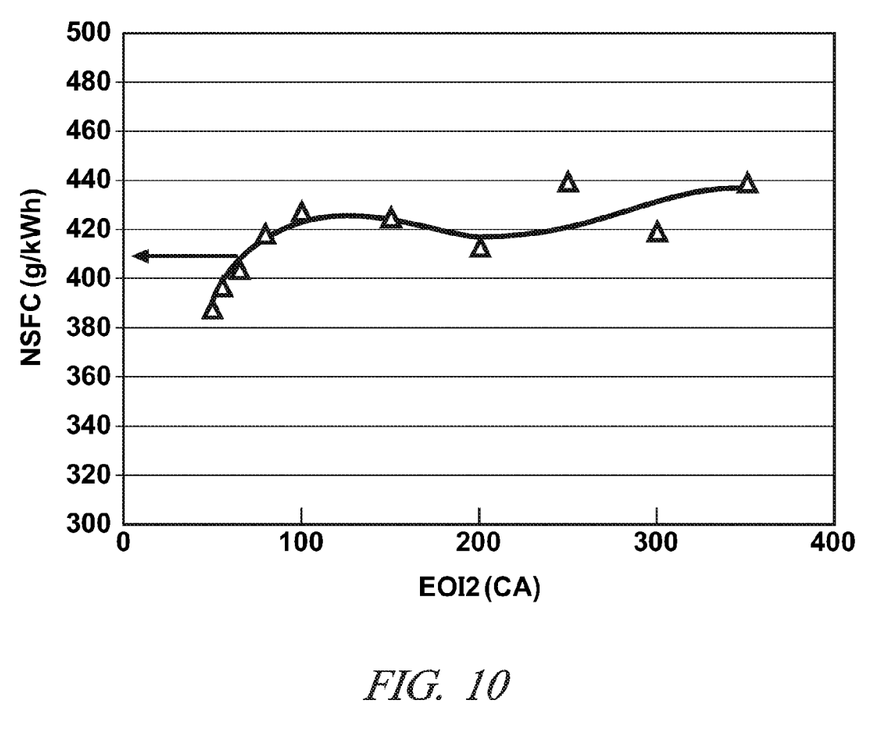
FIG. 10 graphically illustrates net specific fuel consumption as a function of fuel injection timing for a second fuel injection event, in accordance with the present disclosure.

FIG. 10 graphically illustrates results of engine operating showing a relationship between fuel injection timing for the second fuel injection event (EOI2(CA)) and net specific fuel consumption (NSFC g/kWh). FIG. 10 depicts fuel injection timing for the second fuel injection event with respect to crank angle degrees before TDC whereat a last fuel pulse ends. Relationships between net specific fuel consumption and a range of timing of the second fuel injection event for varying engine operating conditions can be determined based upon experimental data and determined for a specific hardware application in one embodiment. The relationships may be stored in memory of the control module 5 and then selected based upon monitored engine operating conditions. The timing of the second fuel injection event is determined based upon the selected relationship between the fuel injection timing for the second fuel injection event and net specific fuel consumption (265). A maximum net specific fuel consumption value is located in the range of timing for the second fuel injection event. The timing of the second fuel injection event is the crank angle corresponding to the minimum net specific fuel consumption value.

Fuel mass for the second fuel injection event is determined based upon the fuel mass for the first and third fuel injection events. The fuel mass for the second fuel injection event is the difference between the total fuel mass and the fuel mass for the first and third fuel injection events, i.e., a remaining fuel mass after subtracting the fuel mass for the first and third fuel injection events from the total fuel mass.

After the control scheme 200 determines fuel mass and spark timing for the first, second, and third fuel injection events, the control scheme 200 actuates the intake and exhaust valves 20 and 18 to achieve a predetermined NVO (270). The control module 5 actuates the fuel injectors 28 based upon the determined fuel mass and fuel timing, and discharges a spark via the spark plug 26 based upon the spark timing (275).

Figure 11:
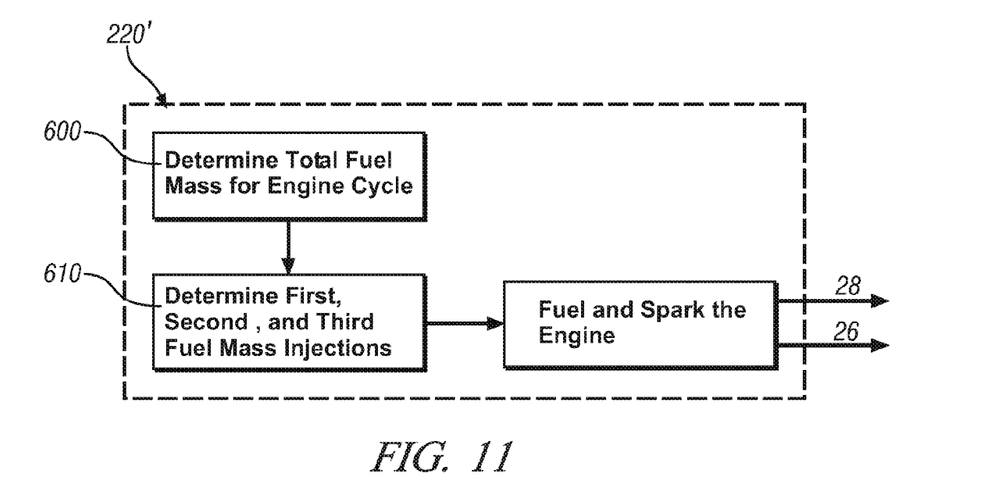
FIG. 11 is a control flow chart of an alternative fuel injection control scheme, in accordance with the present disclosure.

FIG. 11 shows an alternative method for determining the fuel mass for the first, second, and third fuel injections events (220'). A total fuel mass for each engine cycle based upon cylinder conditions and the operator torque request is determined (600). The fuel mass for the first, second, and third fuel injection events is determined based upon the total fuel mass for the engine cycle (610). The total fuel mass for the engine cycle is divided by 3. The resultant is the fuel mass injected for each of the first, second, and third fuel injection events.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a spark ignition direct injection engine configured to control intake and exhaust valves at low loads, the method comprising:
monitoring engine operating conditions and operator inputs;
controlling the intake and exhaust valves to achieve a negative valve overlap period;
determining desired fuel mass injections for first, second, and third fuel injection events of an engine cycle;
executing the first fuel injection event and discharging a first spark during a recompression phase of the negative valve overlap period;
selectively executing the second fuel injection event during an intake phase of the engine cycle; and
executing the third fuel injection event and discharging a second spark during a compression phase of the engine cycle.

2. The method of claim 1, further comprising:
determining a desired fuel mass burned during the recompression phase of the negative valve overlap period based upon a predetermined relationship between NOx emissions and fuel mass burned during the recompression phase of the negative valve overlap period; and
determining the desired fuel mass injection for the first fuel injection event based upon the desired fuel mass burned during the recompression phase of the negative valve overlap period.

3. The method of claim 2, wherein the desired fuel mass burned during the recompression phase of the negative valve overlap period corresponds to a predetermined NOx emissions threshold.

4. The method of claim 3, further comprising determining a timing for the first fuel injection event based upon the desired fuel mass burned during the recompression phase of the engine cycle.

5. The method of claim 1, further comprising:
determining a desired fuel mass burned during the compression phase of the engine cycle based upon a predetermined relationship between combustion stability and fuel mass burned during the compression phase of the engine cycle; and
determining the desired fuel mass injection for the third fuel injection event based upon the desired fuel mass burned during the compression phase of the engine cycle.

6. The method of claim 5, wherein the desired fuel mass burned during the compression phase of the engine cycle corresponds to a predetermined combustion stability threshold.

7. The method of claim 6, further comprising determining a timing for the third fuel injection event based upon the desired fuel mass burned during the compression phase of the engine cycle.

8. The method of claim 6, further comprising determining a timing for discharging the second spark based upon the desired fuel mass burned during the compression phase of the engine cycle.

9. The method of claim 1, wherein determining the desired fuel mass for the second fuel injection event comprises:
determining a total fuel mass for the engine cycle;
determining the desired fuel mass injection for the first fuel injection event based upon a desired fuel mass burned during the recompression phase of the negative valve overlap period;
determining the desired fuel mass injection for the third fuel injection event based upon the desired fuel mass burned during the compression phase of the engine cycle; and
determining the desired fuel mass injection for the second fuel injection event as the difference between the total fuel mass for the engine cycle and the sum of the desired fuel mass injections for the first and third fuel injection events.

10. The method of claim 1, wherein the engine operating conditions comprise engine speed and load and cylinder temperature and pressure.

11. The method of claim 1, further comprising determining a timing for the second fuel injection event based upon a minimum net specific fuel consumption.

12. Method for controlling a spark ignition direct injection engine configured to control intake and exhaust valves at low loads, the method comprising:
monitoring engine operating conditions and operator inputs;
controlling the intake and exhaust valves to achieve a negative valve overlap period;
determining a total fuel mass for an engine cycle based upon the engine operating conditions and the operator inputs, said total fuel mass consisting of equal first, second, and third quantities of fuel;
executing a first fuel injection event comprising injecting said first quantity of fuel and discharging a first spark during a recompression phase of the negative valve overlap period;
executing a second fuel injection event comprising injecting said second quantity of fuel during an intake phase of the engine cycle; and
executing a third fuel injection event comprising injecting said third quantity of fuel and discharging a second spark during a compression phase of the engine cycle.

13. The method of claim 12, further comprising:
determining a timing for the third fuel injection event based upon combustion stability.

14. The method of claim 12, further comprising:
determining a timing for discharging the second spark based upon combustion stability.

15. The method of claim 12, further comprising:
determining a timing for the first fuel injection event based upon a desired fuel mass burned during the recompression phase of the negative valve overlap period.

16. The method of claim 12, further comprising:
determining a timing for the second fuel injection event based upon a maximum net specific fuel consumption.

17. Method for controlling a spark ignition direct injection engine including controllable intake and exhaust valves, the method comprising:
controlling the intake and exhaust valves to achieve a negative overlap period;
executing a first fuel injection event and discharging a first spark during a recompression phase of the negative valve overlap period and subsequently executing a second fuel injection event and discharging a second spark during a compression phase; and
wherein the first fuel injection event comprises a first fuel mass sufficient to achieve a desired fuel mass burn corresponding to a preferred level of NOx emissions and the second fuel injection event comprises a second fuel mass sufficient to achieve a preferred level of combustion stability.

18. The method of claim 17, wherein the preferred level of NOx emissions is a predetermined maximum NOx emissions threshold.

19. The method of claim 17, wherein the preferred level of combustion stability is a minimum combustion stability threshold.

* * * * *